United States Patent
Stone et al.

(10) Patent No.: US 10,405,114 B2
(45) Date of Patent: Sep. 3, 2019

(54) AUTOMATED DETECTION OF AN ACTIVE AUDIO OUTPUT

(71) Applicant: DTS, Inc., Calabasas, CA (US)

(72) Inventors: Glen Stone, Los Gatos, CA (US); Twafik Mohamed, Bangor (GB)

(73) Assignee: DTS, Inc., Calabasas, CA (US)

( * ) Notice: Subject to any disclaimer, the term of this patent is extended or adjusted under 35 U.S.C. 154(b) by 0 days.

(21) Appl. No.: 15/828,284

(22) Filed: Nov. 30, 2017

(65) Prior Publication Data

US 2018/0152796 A1 May 31, 2018

Related U.S. Application Data (60) Provisional application No. 62/428,430, filed on Nov. 30, 2016.

(51) Int. Cl.
*H04R 29/00* (2006.01)
*G10L 25/51* (2013.01)
*G06F 3/16* (2006.01)
*H04R 1/10* (2006.01)
*H04R 3/00* (2006.01)

(52) U.S. Cl.
CPC .......... *H04R 29/001* (2013.01); *G06F 3/165* (2013.01); *G10L 25/51* (2013.01); *H04R 1/1041* (2013.01); *H04R 3/00* (2013.01); *H04R 2420/05* (2013.01)

(58) Field of Classification Search
CPC ...... H04R 29/001; H04R 1/1041; H04R 3/00; G06F 3/165; G10L 25/51
See application file for complete search history.

(56) References Cited

U.S. PATENT DOCUMENTS

| | | | |
|---|---|---|---|
| 5,647,011 A | 7/1997 | Garvis | |
| 6,321,278 B1 | 11/2001 | Phu et al. | |
| 8,098,838 B2 | 1/2012 | Lee et al. | |
| 2001/0049566 A1* | 12/2001 | Kim | ............ H03G 3/3089 700/94 |
| 2005/0021967 A1 | 1/2005 | Bruekers et al. | |
| 2006/0050908 A1 | 3/2006 | Shteyn et al. | |
| 2012/0281850 A1 | 11/2012 | Hyatt | |
| 2015/0078573 A1 | 3/2015 | Nicholson | |

OTHER PUBLICATIONS

PCT International Search Report and Written Opinion in corresponding PCT Application No. PCT/US17/64079, 15 pages.

* cited by examiner

*Primary Examiner* — Andrew L Sniezek
(74) *Attorney, Agent, or Firm* — Craig S. Fischer (57) ABSTRACT

An active audio output detection system and method that automatically determines the type of audio output being used on an audio playback device. Embodiments of the system and method include playing back audio content on the audio playback device (such as a mobile phone) and capturing sound during playback using an audio capture device (such as a microphone). The captured sound is analyzed to determine whether the audio playing back on the audio playback device is contained therein. If the captured sound matches the audio playing back on the audio playback device, then the active audio output is a loudspeaker. On the other hand, if the captured sound does not match the audio playing back on the audio playback device, then the active audio output is headphones.

16 Claims, 6 Drawing Sheets

AUTOMATED DETECTION OF AN ACTIVE AUDIO OUTPUT

BACKGROUND

There are several circumstances when it is advantageous to know which audio output on a device is active. For example, it may be desirable to know whether audio content is being played back or reproduced on an audio playback device (such as a mobile phone) through loudspeakers or headphones. One situation in which this is useful is when audio processing is being applied to the audio signal containing the content being played back. Audio signal processing typically is used to achieve the best sound possible from a playback device. Just as photography and video processing commonly is used to improve the visual experience of a photograph or video, audio signal processing is frequently used to improve the auditory experience of audio content.

The type of audio signal processing used, however, often is different for an audio signal played back through headphones as compared to being played back over speakers. For example, audio spatial virtualization, which gives the illusion that sounds are originating from specific locations in 3D space, is different depending on whether the audio content is being heard through speakers or headphones. This difference between audio processing techniques used can become problematic when a playback device (such as a mobile phone) is capable of playing back audio content either through speakers or headphones.

The playback device typically communicates with the headphones or speakers using certain output endpoints such as lineout, Bluetooth® (a registered trademark of Bluetooth SIG), and Wi-Fi® (a registered trademark of the Wi-Fi Alliance). However, in order to match the correct processing to the output types a listener is burdened with manually informing the playback device to use headphone mode or speaker mode. The burden on the listener can be a barrier to adoption of otherwise attractive audio processing technologies as the listener may find it easier to turn off the processing rather than have to manually switch between headphone mode and speaker mode.

Several different techniques exist to automatically identify whether audio content is being played back through speakers or headphones. One such method is "jack detection" that detects when headphones are plugged into the headphone jack on the playback device. One problem, however, is that speakers may also be plugged into the headphone jack and the jack detection technique cannot differentiate between headphones and speakers. Thus, the jack detection technique is not always a reliable indicator of whether headphones or speakers are in use.

Impedance matching techniques can be used to detect whether headphones or speakers are connected to the playback device. However, impedance matching techniques often have implementation issues. Moreover, impedance matching is dependent on manufacturers to provide impedance values to create and maintain a database for the impedance matching technique to use.

Similar to impedance matching techniques are wireless device identification techniques. As noted above, Bluetooth and Wi-Fi are popular wireless protocols that support both wireless speakers and headphones. The wireless device identification techniques use a "device ID" assigned to a particular wireless device to determine whether the wireless device is headphones or speakers. One problem with the wireless device identification techniques is that they require the creation and maintenance of a device database to categorize wireless devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the active audio output detection system and method determine the audio output being used on an audio playback device. Embodiments of the system and method are useful to determine, for example, whether audio content is being played back on the audio playback device through a loudspeaker or through headphones. This is important in situations where it is desirable to know whether to use audio processing techniques optimized for loudspeakers or those techniques optimized for headphones. Embodiments of the system and method require no lookup tables or databases in order to determine the type of audio reproduction device (such as loudspeakers or headphones) being used.

Embodiments include a method for automatically detecting an active audio output of an audio playback device. The method includes playing back audio content on the audio playback device and capturing sound during playback using an audio capture device. The audio capture device is in communication with the audio playback device. The method then analyzes whether the captured sound matches the audio playing back on the audio playback device. The method uses this analysis to determine the active audio output of the audio playback device. For example, if the captured sound matches the audio playing back on the audio playback device, then the active audio output is a loudspeaker. On the other hand, if the captured sound does not match the audio playing back on the audio playback device, then the active audio output is headphones.

The method also modifies the audio content playback based on the determination of the active audio output. In some embodiments the audio capture device is a microphone on the audio playback device. In other embodiments the audio capture device is a microphone that is in communication with the audio playback device but not necessarily on the audio playback device. In some embodiments the method determines the active audio output of the audio playback device based on the analysis without the use of special audio tones or audio watermarks. In other embodiments the method sends a signal from the audio playback device to another device in communication with the audio playback device indicating the active audio output of the audio playback device.

Embodiments also include a method for determining a type of audio reproduction device in communication with an audio playback device. The method includes playing back audio content on the audio playback device over the audio reproduction device and listening for the audio content during playback using an audio capture device to determine whether the audio content being played back is present. The method determines that the type of audio reproduction device is a loudspeaker if the audio content is present. On the other hand, the method determines that the type of audio reproduction device is headphones if the audio content is not present.

In some embodiments the method applies an audio processing technique designed for loudspeakers if the determination is that the type of audio reproduction device is a loudspeaker. In other embodiments the method applies an audio processing technique designed for headphones if the if the determination is that the type of audio reproduction device is headphones.

Embodiments also include a system for automatically determining a type of audio reproduction device connected to a mobile phone. The system includes audio content that is played back on the mobile phone through the audio reproduction device. The system further includes an audio capture device that captures sound while the audio content is being played back. In addition, the system includes an analysis processor that performs an analysis as to whether the audio content is present in the captured sound and a selection processor that determines the type of audio reproduction device based on the analysis. In some embodiments the system includes an audio processing technique for loudspeakers that is applied to the audio content if the selection processor determines that the type of audio reproduction device is a loudspeaker. In other embodiments the system includes an audio processing technique for headphones that is applied to the audio content if the selection processor determines that the type of audio reproduction device is headphones.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout.

DETAILED DESCRIPTION

In the following description of embodiments of an active audio output detection system and method reference is made to the accompanying drawings. These drawings shown by way of illustration specific examples of how embodiments of the active audio output detection system and method may be practiced. It is understood that other embodiments may be utilized and structural changes may be made without departing from the scope of the claimed subject matter.

I. System Overview

Embodiments of the active audio output detection system and method are used to automatically detect which audio output of a device is active. This is achieved by listening during audio playback of audio content on the device to determine whether the audio content being played back can be heard. If so, then the active audio output is loudspeakers. Otherwise, the active audio output is headphones. An overview of embodiments of the codec and method will now be discussed.

Figure 1:
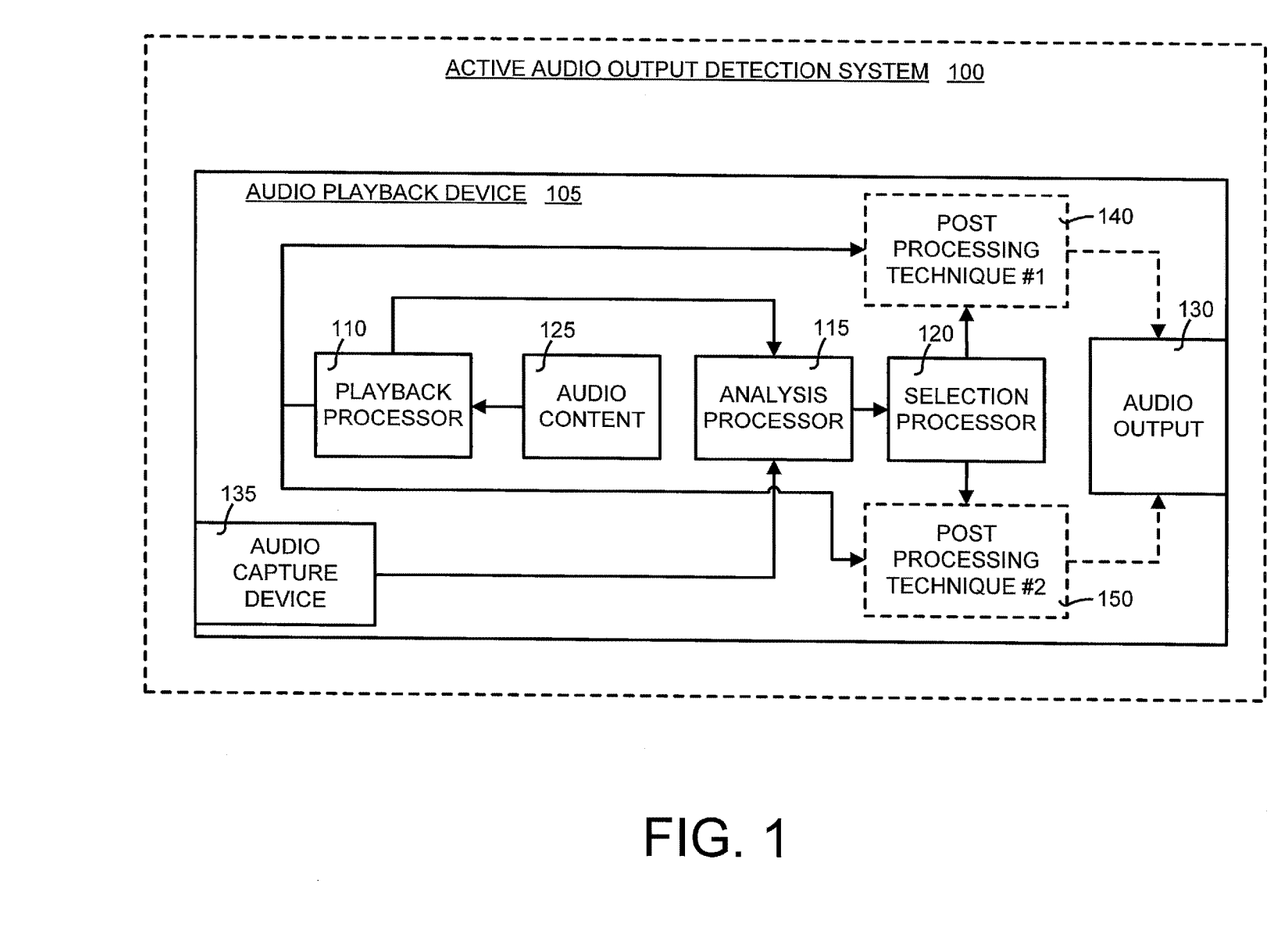
FIG. 1 is a block diagram illustrating a general overview of embodiments of an active audio output detection system and method.

FIG. 1 is a block diagram illustrating a general overview of embodiments of an active audio output detection system 100 and method. Referring to FIG. 1, the active audio output detection system 100 includes an audio playback device 105 (such as a mobile phone). The audio playback device 105 includes a playback processor 110, an analysis processor 115, and a selection processor 120. The playback processor 110 plays back audio content 125 on the audio playback device 105 through an audio output 130. The audio output 130 may have one or more connected audio reproduction devices, such as loudspeakers and headphones.

The analysis processor 115 takes input from an audio capture device (such as a microphone) and the playback processor 110 and performs an analysis on the two inputs. As explained in detail below, the analysis is to determine whether the audio content 125 playing back on the audio playback device 105 is present in the sounds being capture by the audio capture device 135 during the same time period. In alternate embodiments the analysis is to determine whether an audio indicator (such as a special audio tone or an audio watermark) is present in the captured sounds.

The selection processor 120 interprets the analysis done by the analysis processor 115 and determines the type of active audio output. In some embodiments the type of active audio output is either loudspeakers or headphones. In some embodiments the audio playback device 105 includes optional (as shown by the dashed lines in FIG. 1) post-processing techniques, such as post-processing technique #1 140 and post-processing technique #2 150. In some embodiments the two post-processing techniques are one for loudspeakers and one for headphones. The term "headphones" includes traditional headphones, earbuds, earphones, and other direct-to-ear or near-the-ear audio rendering devices.

In some embodiments of the active audio output detection system 100 and method the audio capture device 135 is contained on the audio playback device 105. In other embodiments the audio capture device 135 is in communication with but not contained on the audio playback device 105.

Figure 2:
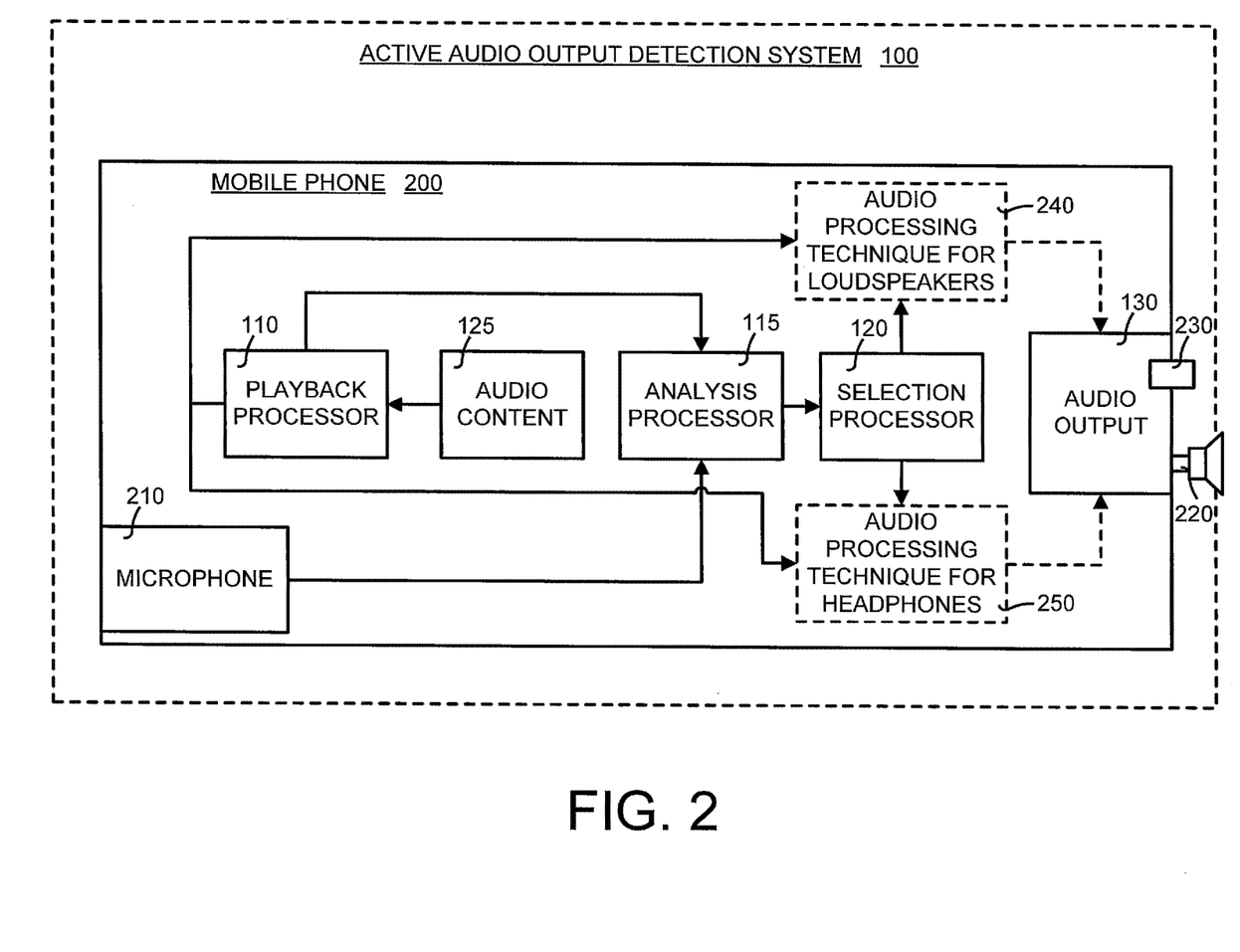
FIG. 2 is a block diagram illustrating a general overview of one embodiment of the active audio output detection system and method.

FIG. 2 is a block diagram illustrating a general overview of one embodiment of the active audio output detection system 100 and method. Referring to FIG. 2, illustrated is the embodiments where the active audio output detection system 100 is implemented on a mobile phone 200. The mobile phone 200 contains the playback processor 110, the analysis processor 115, and the selection processor 120, as described above. The mobile phone also includes microphone 210 and the audio output 130 includes a loudspeaker 220 and a headphone jack 230. This embodiment includes an audio post-processing technique for loudspeakers 240 and an audio processing technique for headphones 250.

II. Operational Details

The details of the active audio output detection system 100 and method will now be discussed. It should be noted that many variations are possible and that one of ordinary skill in the art will see many other ways in which the same outcome can be achieved based on the disclosure herein.

Figure 3:
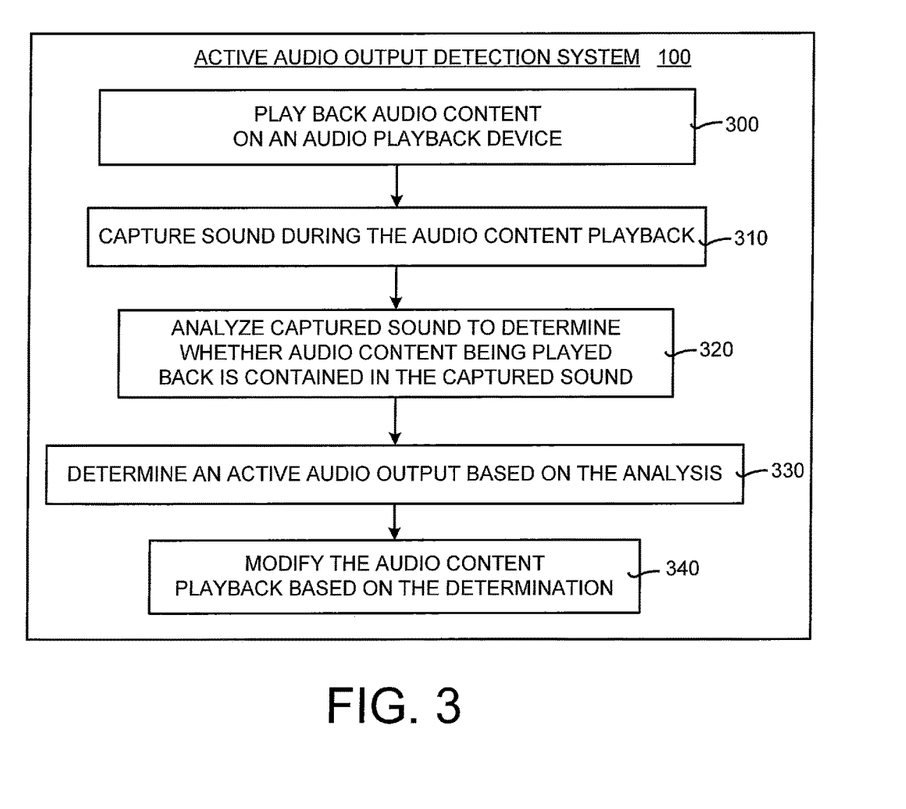
FIG. 3 is a flow diagram illustrating embodiments of the operation of the active audio output detection system and method shown in FIGS. 1 and 2.

FIG. 3 is a flow diagram illustrating embodiments of the operation of the active audio output detection system 100 and method shown in FIGS. 1 and 2. Referring to FIG. 3, the operation begins by playing back audio content on an audio playback device (box 300). During audio playback sound is captured (box 310). The method performs an analysis between the captured sound and the audio content being played back (box 320). This analysis determines whether the audio content being played is present in the captured sound.

The method determines the active audio output based on the analysis (box 330). In some embodiments, if the audio content being played is present in the captured sound then the active audio output is a loudspeaker. On the other hand, if the audio content is not present then the active audio output is headphones.

The method then modifies the audio content playback based on the determination (box 340). In some embodiments an audio processing technique for loudspeakers is applied if the determination is that the active audio output is headphones. If determination is that the active audio output is loudspeakers, then an audio processing technique for loudspeakers is applied. In some embodiments the system 100 sends a signal from the audio playback device 105 to another device in communication with the audio playback device 105. This signal indicates and notifies the other device as to which is the active audio output of the audio playback device.

Figure 4:
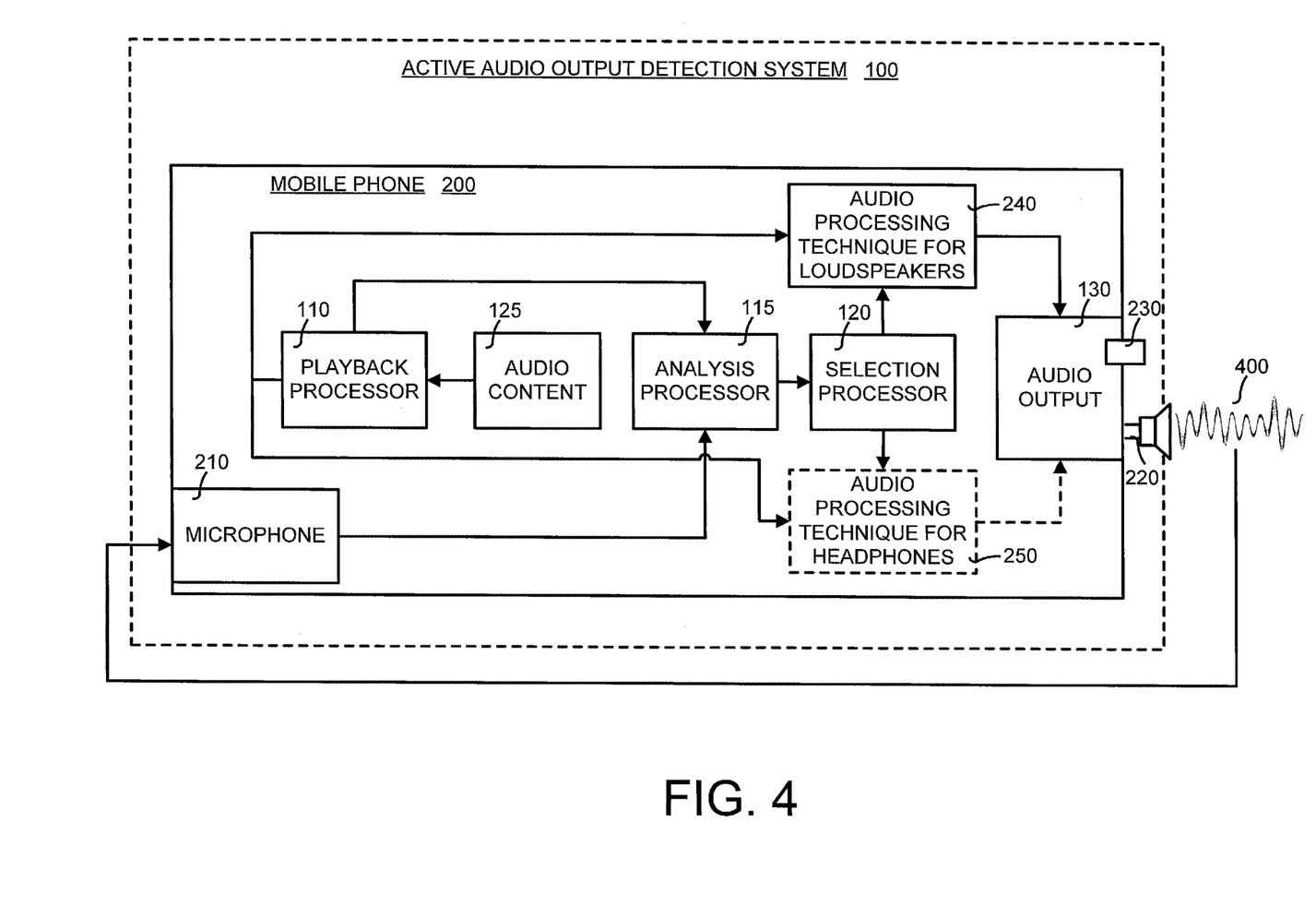
FIG. 4 is a block diagram illustrating the embodiments of the active audio output detection system and method shown in FIG. 2 where the active audio output is a loudspeaker.

FIG. 4 is a block diagram illustrating the embodiments of the active audio output detection system 100 and method shown in FIG. 2 where the active audio output is a loudspeaker. Referring to FIG. 4, the playback processor 120 is playing back the audio content 125 through the loudspeaker 220. At the same time as the playback of the audio content 125 the microphone is listening and captures sound 400 from the loudspeaker 220. The microphone sends the captured sound to the analysis processor 115 that compares the captured sound to the audio content being played back. The analysis processor determines that the audio content is present in the captured sound. The selection processor 120 receives this analysis and determines that the active audio output is the loudspeaker 220. The system 100 modifies the audio content playback to apply the audio processing technique for loudspeakers 240 to the output signal containing the audio content. Note that in FIG. 4 the audio processing technique for headphones 250 is shown as a dashed box to indicate that this processing technique is not active because the active audio output is the loudspeaker 220.

Figure 5:
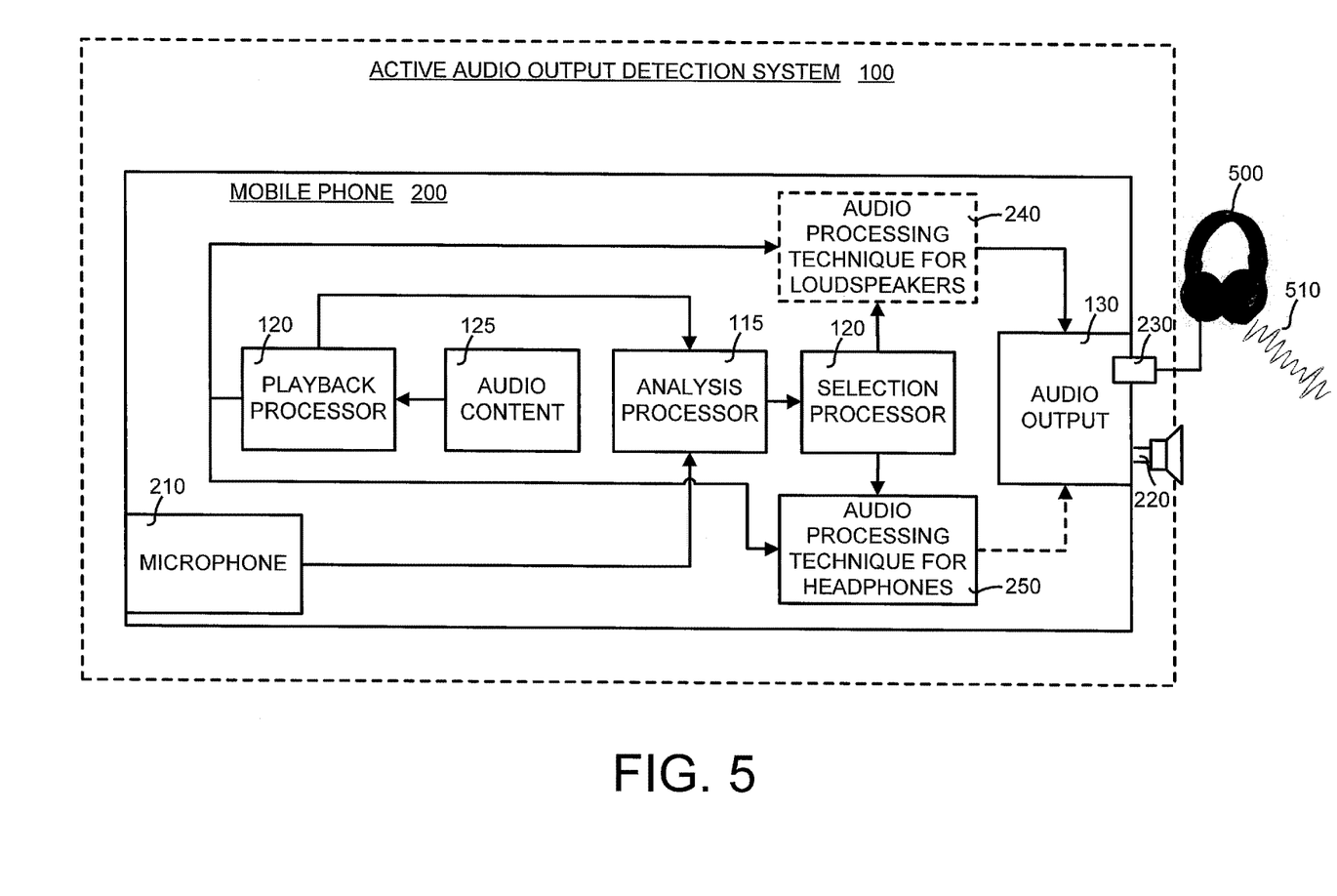
FIG. 5 is a block diagram illustrating the embodiments of the active audio output detection system and method shown in FIG. 2 where the active audio output is headphones.

FIG. 5 is a block diagram illustrating the embodiments of the active audio output detection system 100 and method shown in FIG. 2 where the active audio output is headphones. Referring to FIG. 5, the playback processor 120 is playing back the audio content 125 through the headphones 500. The sound 510 containing the audio content 125 being played back is only coming through the headphones and cannot be heard except by the listener (not shown) wearing the headphones 500. At the same time as the playback of the audio content 125 the microphone is listening but does not capture the sound 510 containing the audio content 125 coming through the headphones 500. The microphone sends the captured sound to the analysis processor 115 that compares the captured sound to the audio content being played back. The analysis processor determines that the audio content is not present in the captured sound. The selection processor 120 receives this analysis and determines from this analysis that the active audio output is the headphones 500. The system 100 modifies the audio content playback to apply the audio processing technique for headphones 250 to the output signal containing the audio content. Note that in FIG. 5 the audio processing technique for loudspeakers 240 is shown as a dashed box to indicate that this processing technique is not active because the active audio output is the headphones 500.

III. Alternate Embodiments and Exemplary Operating Environment

Figure 6:
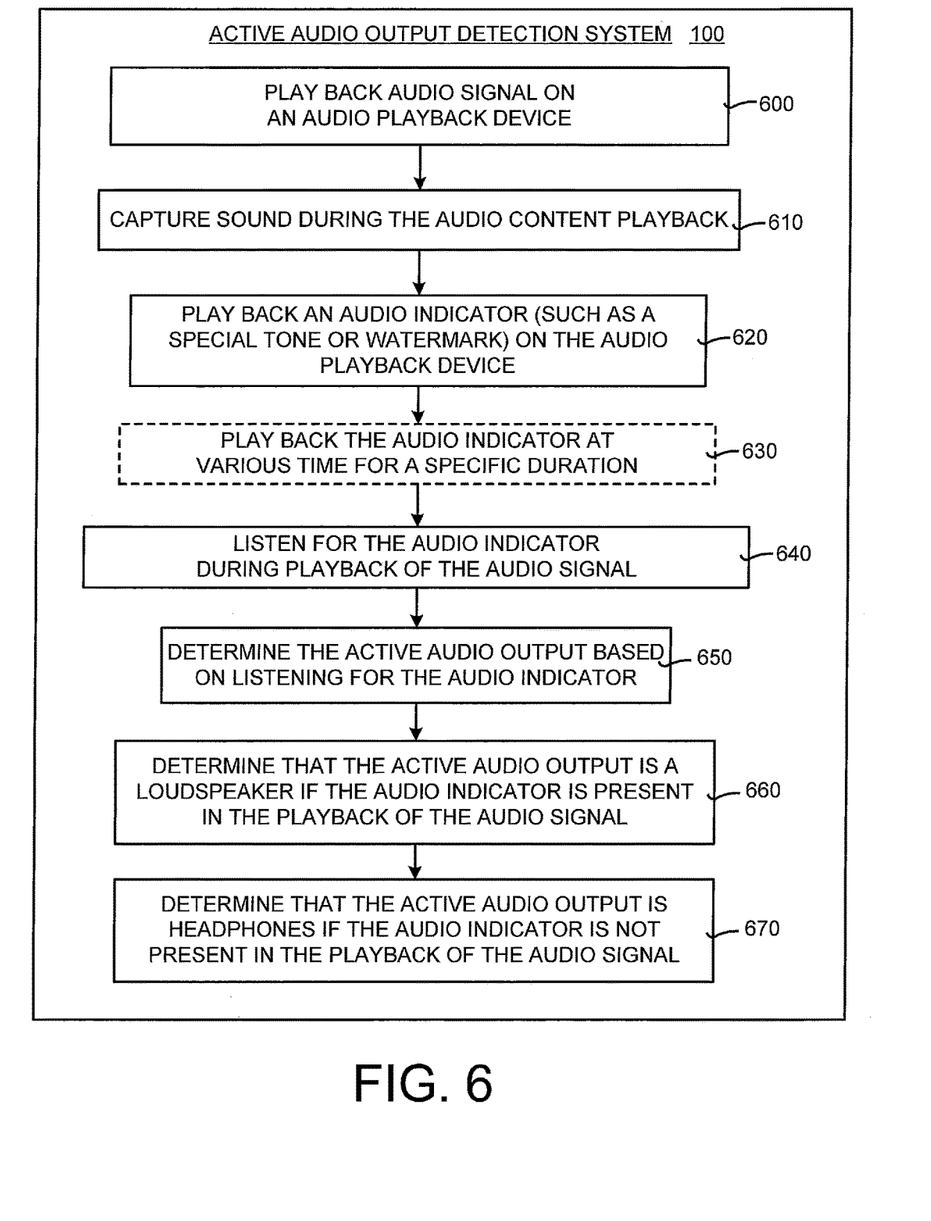
FIG. 6 is a flow diagram illustrating alternate embodiments of the operation of the active audio output detection system and method shown in FIGS. 1-5.

Alternate embodiments of the active audio output detection system 100 and method are possible. By way of example, FIG. 6 is a flow diagram illustrating alternate embodiments of the operation of the active audio output detection system 100 and method shown in FIGS. 1-5. The method begins by playing back an audio signal on an audio playback device 105 (box 600). This audio playback device 105 may be a mobile phone 200 or any other type of device capable of playing audio content 125. The audio signal typically contains audio content 125 either stored on the audio playback device 105 or obtained external to the audio playback device 105.

During the playback of the audio signal an audio capture device 135 captures sound (box 610). The audio capture device 135 may be contained on the audio playback device 105 or in communication with the audio playback device 105. During audio playback an audio indicator is also played on the audio playback device 105 (box 620). This audio indicator may be a special audio tone or a watermark. The audio indicator may be audible to the human ear or inaudible to the human ear (such as frequencies higher that the human ear can perceive).

In some embodiments the audio indicator is played back continuously. In other embodiments the audio indicator is played back at various times and only for a specific duration (box 630). This operation is shown as optional by the dashed box. The audio capture device 135 listens for the audio indicator during the playback of the audio signal (box 640). The sound captured by the audio capture device 135 during the audio content playback is analyzed to determine whether the audio indicator is present. Based on this analysis the system 100 determines the active audio output (box 650).

If the system 100 determines that the audio indicator is present in the playback of the audio signal (or the sound captured by the audio capture device 135) then the active audio output is a loudspeaker 220 (box 660). If the system 100 determines that the audio indicator is not present in the playback of the audio signal (or the sound captured by the audio capture device 135) then the active audio output is headphones 230 (box 670).

Many other variations than those described herein will be apparent from this document. For example, depending on the embodiment, certain acts, events, or functions of any of the methods and algorithms described herein can be performed in a different sequence, can be added, merged, or left out altogether (such that not all described acts or events are necessary for the practice of the methods and algorithms). Moreover, in certain embodiments, acts or events can be performed concurrently, such as through multi-threaded processing, interrupt processing, or multiple processors or processor cores or on other parallel architectures, rather than sequentially. In addition, different tasks or processes can be performed by different machines and computing systems that can function together.

The various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The various illustrative logical blocks and modules described in connection with the embodiments disclosed herein can be implemented or performed by a machine, such as a general purpose processor, a processing device, a computing device having one or more processing devices, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor and processing device can be a microprocessor, but in the alternative, the processor can be a controller, microcontroller, or state machine, combinations of the same, or the like. A processor can also be implemented as a combination of computing devices, such as a combination of a DSP and a microprocessor, a plurality of microprocessors, one or more microprocessors in conjunction with a DSP core, or any other such configuration.

Embodiments of the active audio output detection system 100 and method described herein are operational within numerous types of general purpose or special purpose computing system environments or configurations. In general, a computing environment can include any type of computer system, including, but not limited to, a computer system based on one or more microprocessors, a mainframe computer, a digital signal processor, a portable computing device, a personal organizer, a device controller, a computational engine within an appliance, a mobile phone, a desktop computer, a mobile computer, a tablet computer, a smartphone, and appliances with an embedded computer, to name a few.

Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, and so forth. In some embodiments the computing devices will include one or more processors. Each processor may be a specialized microprocessor, such as a digital signal processor (DSP), a very long instruction word (VLIW), or other micro-controller, or can be conventional central processing units (CPUs) having one or more processing cores, including specialized graphics processing unit (GPU)-based cores in a multi-core CPU.

The process actions of a method, process, block, or algorithm described in connection with the embodiments disclosed herein can be embodied directly in hardware, in software executed by a processor, or in any combination of the two. The software can be contained in computer-readable media that can be accessed by a computing device. The computer-readable media includes both volatile and non-volatile media that is either removable, non-removable, or some combination thereof. The computer-readable media is used to store information such as computer-readable or computer-executable instructions, data structures, program modules, or other data. By way of example, and not limitation, computer readable media may comprise computer storage media and communication media.

Computer storage media includes, but is not limited to, computer or machine readable media or storage devices such as Bluray discs (BD), digital versatile discs (DVDs), compact discs (CDs), floppy disks, tape drives, hard drives, optical drives, solid state memory devices, RAM memory, ROM memory, EPROM memory, EEPROM memory, flash memory or other memory technology, magnetic cassettes, magnetic tapes, magnetic disk storage, or other magnetic storage devices, or any other device which can be used to store the desired information and which can be accessed by one or more computing devices.

Software can reside in the RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an application specific integrated circuit (ASIC). The ASIC can reside in a user terminal. Alternatively, the processor and the storage medium can reside as discrete components in a user terminal.

The phrase "non-transitory" as used in this document means "enduring or long-lived". The phrase "non-transitory computer-readable media" includes any and all computer-readable media, with the sole exception of a transitory, propagating signal. This includes, by way of example and not limitation, non-transitory computer-readable media such as register memory, processor cache and random-access memory (RAM).

The phrase "audio signal" is a signal that is representative of a physical sound. One way in which the audio signal is constructed by capturing physical sound. The audio signal is played back on a playback device to generate physical sound such that audio content can be heard by a listener. A playback device may be any device capable of interpreting and converting electronic signals to physical sound.

Retention of information such as computer-readable or computer-executable instructions, data structures, program modules, and so forth, can also be accomplished by using a variety of the communication media to encode one or more modulated data signals, electromagnetic waves (such as carrier waves), or other transport mechanisms or communications protocols, and includes any wired or wireless information delivery mechanism. In general, these communication media refer to a signal that has one or more of its characteristics set or changed in such a manner as to encode information or instructions in the signal. For example, communication media includes wired media such as a wired network or direct-wired connection carrying one or more modulated data signals, and wireless media such as acoustic, radio frequency (RF), infrared, laser, and other wireless media for transmitting, receiving, or both, one or more modulated data signals or electromagnetic waves. Combinations of the any of the above should also be included within the scope of communication media.

Further, one or any combination of software, programs, computer program products that embody some or all of the various embodiments of the active audio output detection system 100 and method described herein, or portions thereof, may be stored, received, transmitted, or read from any desired combination of computer or machine readable media or storage devices and communication media in the form of computer executable instructions or other data structures.

Embodiments of the active audio output detection system 100 and method described herein may be further described in the general context of computer-executable instructions, such as program modules, being executed by a computing device. Generally, program modules include routines, programs, objects, components, data structures, and so forth, which perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the scope of the disclosure. As will be recognized, certain embodiments of the inventions described herein can be embodied within a form that does not provide all of the features and benefits set forth herein, as some features can be used or practiced separately from others.

Moreover, although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims.

What is claimed is:

1. A method for automatically detecting an active audio output of an audio playback device, comprising:
    playing back audio content on the audio playback device;
    capturing sound during audio content playback using an audio capture device in communication with the audio playback device;
    analyzing whether the captured sound matches the audio playing back on the audio playback device to generate an analysis; and
    determining the active audio output of the audio playback device based on the analysis;
    wherein the audio capture device is a microphone on the audio playback device.

2. The method of claim 1, further comprising determining that the active audio output of the audio playback device is a loudspeaker if the captured sound matches the audio playing back on the audio playback device.

3. The method of claim 1, further comprising determining that the active audio output of the audio playback device is headphones if the captured sound does not match the audio playing back on the audio playback device.

4. The method of claim 1, further comprising modifying the audio content playback based on the determination of the active audio output.

5. The method of claim 1, wherein the audio capture device is a microphone in communication with the audio playback device.

6. The method of claim 1, further comprising determining the active audio output of the audio playback device based on the analysis without the use of special audio tones or audio watermarks.

7. The method of claim 1, further comprising sending a signal from the audio playback device to another device in communication with the audio playback device indicating the active audio output of the audio playback device.

8. A method for reducing analysis complexity of determining an active audio output of a device; comprising:
    playing an audio indicator through the device;
    listening for the audio indicator using a microphone; and
    determining the active audio output of the device based on listening for the audio indicators;
    wherein the audio indicator is outside a human audible frequency range.

9. The method of claim 8, further comprising:
    playing audio content other than the audio indicator simultaneously with the audio indicator; and
    ignoring the audio content other than the audio indicator.

10. The method of claim 8, further comprising playing the audio indicator at various times and for a specified duration and not continuously.

11. A method for determining a type of audio reproduction device in communication with an audio playback device, comprising:
    playing back audio content on the audio playback device over the audio reproduction device;
    capturing sound during the audio content playback;
    listening for the audio content in the sound captured during the audio content playback using an audio capture device to determine whether the audio content being played back is present;
    determining that the type of audio reproduction device is a loudspeaker if the audio content is present; and
    determining that the type of audio reproduction device is headphones if the audio content is not present.

12. The method of claim 11, further comprising applying an audio processing technique designed for loudspeakers if the determination is that the type of audio reproduction device is a loudspeaker.

13. The method of claim 11, further comprising applying an audio processing technique designed for headphones if the if the determination is that the type of audio reproduction device is headphones.

14. A system for automatically determining a type of audio reproduction device connected to a mobile phone, comprising:
- audio content that is played back on the mobile phone through the audio reproduction device;
- an audio capture device that captures sound while the audio content is being played back;
- an analysis processor that performs an analysis as to whether the audio content is present in the captured sound; and
- a selection processor that determines the type of audio reproduction device based on the analysis.

15. The system of claim 14, further comprising an audio processing technique for loudspeakers that is applied to the audio content if the selection processor determines that the type of audio reproduction device is a loudspeaker.

16. The system of claim 14, further comprising an audio processing technique for headphones that is applied to the audio content if the selection processor determines that the type of audio reproduction device is headphones.

* * * * *